(12) United States Patent
Shcherba et al.

(10) Patent No.: US 12,229,247 B1
(45) Date of Patent: Feb. 18, 2025

(54) EMBEDDING INSECURE WEB APPLICATIONS IN SECURE WEB PAGES

(71) Applicant: Amazon Technologies, Inc., Seattle, WA (US)

(72) Inventors: Viktor Shcherba, Leiden (NL); Matthijs Van Henten, Diemen (NL); Arron Bailiss, Amsterdam (NL)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 17/710,623

(22) Filed: Mar. 31, 2022

(51) Int. Cl.
*G06F 21/53* (2013.01)
*G06F 9/54* (2006.01)

(52) U.S. Cl.
CPC .............. *G06F 21/53* (2013.01); *G06F 9/547* (2013.01); *G06F 2221/033* (2013.01)

(58) Field of Classification Search
CPC ..... G06F 21/53; G06F 9/547; G06F 2221/033
See application file for complete search history.

(56) References Cited

U.S. PATENT DOCUMENTS

| | | | |
|---|---|---|---|
| 7,720,879 B2 | 5/2010 | Tsyganskiy et al. | |
| 9,979,726 B2 | 5/2018 | Freitas FOrtuna dos Santos et al. | |
| 10,447,684 B2 | 10/2019 | Ghanaie-Sichanie et al. | |
| 2010/0146379 A1* | 6/2010 | George | G06F 21/53 709/219 |
| 2013/0145357 A1* | 6/2013 | Korycki | G06F 8/38 717/172 |
| 2016/0080358 A1* | 3/2016 | Ghanaie-Sichanie | H04L 63/08 709/229 |
| 2023/0081429 A1* | 3/2023 | Babtkis | G06F 9/44526 726/17 |

FOREIGN PATENT DOCUMENTS

EP 2877922 3/2015

* cited by examiner

*Primary Examiner* — Sangseok Park
(74) *Attorney, Agent, or Firm* — S. Scot Foster; Kowert, Hood, Munyon, Rankin & Goetzel, P.C.

(57) ABSTRACT

Embedding an insecure application within a host application is performed. Modern applications may incorporate smaller applications into a common interface with some applications requiring more privilege than others. A host application may be configured to load an application into a sandboxed frame to create separate security zones by isolating the originating domains of the respective applications. Security authorization for the sandboxed application may be obtained by the host application as part of initialization. Then, operations to be performed by the sandboxed application that require origination from the host domain may be requested by the application to the host using a Remote Procedure Call (RPC) mechanism. The host may then perform the requested operations on behalf of the application and return the results via RPC. In this manner, the embedded application may employ greater application privileges without increasing security vulnerabilities of the host.

20 Claims, 8 Drawing Sheets

EMBEDDING INSECURE WEB APPLICATIONS IN SECURE WEB PAGES

BACKGROUND

Modern applications are increasingly deployed to execute within a web browser. This provides a number of benefits, including ease of deployment and support as well as a more consistent user experience, and it also provides new opportunities, as separate web applications can be incorporated into a single larger application, or into a common web page, to the benefit of users. This approach comes with new challenges however, as modern web applications inherit the complex security concerns of the web ecosystem. Integrating multiple web applications into a single composite application or web page then means that the composite application may have to operate with the collective privileges required for each of the incorporated applications, thus creating greater security vulnerabilities for the composite application.

Figure 1:
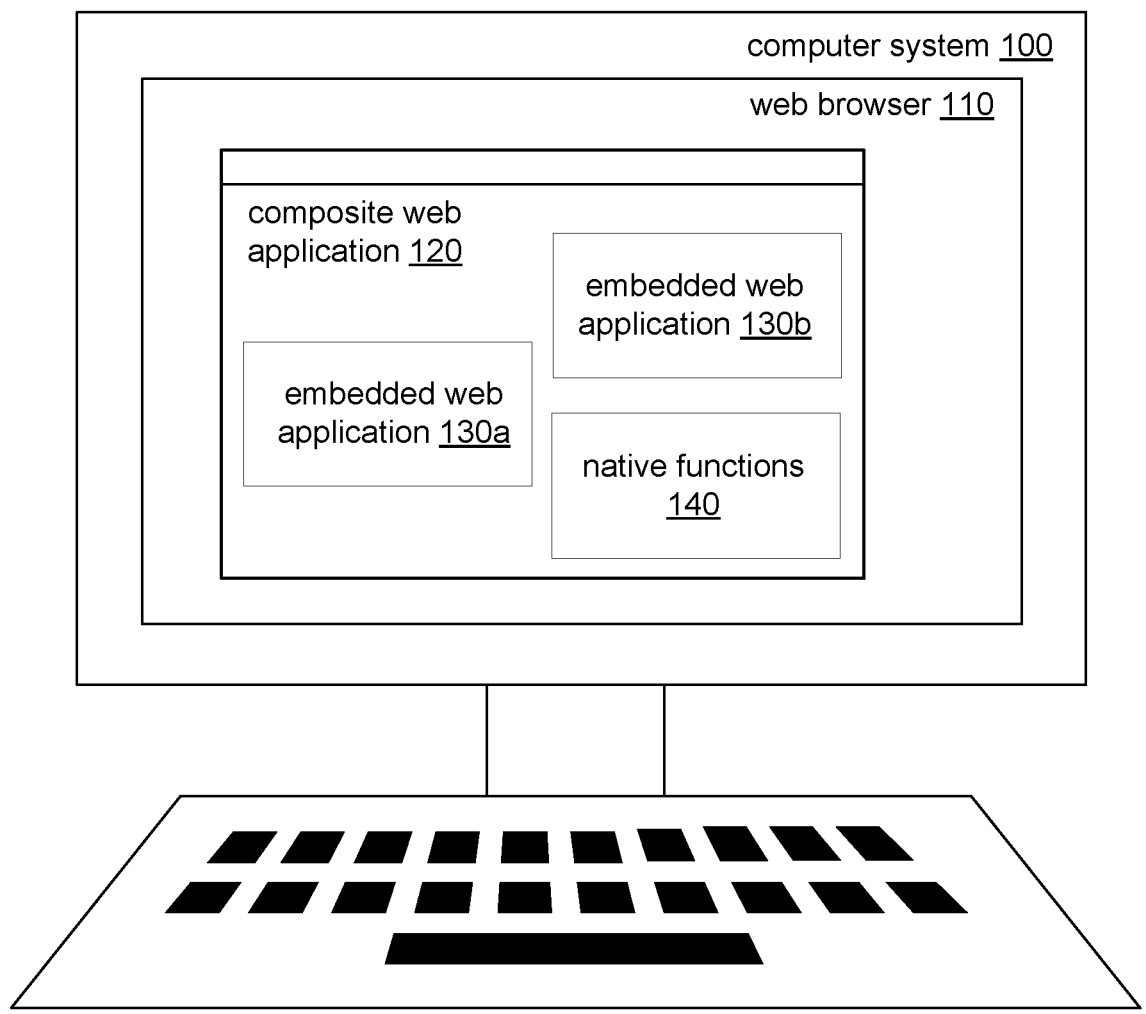
FIG. 1 is a block diagram illustrating a system that safely embeds an insecure application into a secure application, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Modern applications are increasingly deployed to execute within a web browser. This provides a number of benefits, including ease of deployment and support as well as a more consistent user experience, and it also provides new application development opportunities, as separate web applications may be incorporated into a single larger application, or into a common web page, to the benefit of users. This approach comes with new challenges however, as modern web applications inherit the complex security concerns of the web ecosystem. Integrating multiple web applications into a single composite application or web page then means that the composite application may have to operate with the collective privileges required for each of the incorporated applications, thus creating greater security vulnerabilities for the composite application. For example, an application to be embedded may require access to certain Application Programming Interfaces (APIs) or User Interface (UI) elements that require additional privileges that would elevate the security exposure to cross-site scripting (XSS) attacks of a host application should the integration be performed.

Systems and methods for safely embedding an insecure application within a host application are described herein. Modern applications may incorporate smaller applications into a common interface with some applications requiring more privilege than others. A host application may be configured to load an insecure application into a sandboxed frame to create separate security zones by isolating the originating domains of the respective applications. A secure wrapper around the insecure application to be embedded embeds the insecure application into the host application in a sandboxed iframe by utilizing a separate origin for the wrapper.

Security authorization for the sandboxed application may, in some embodiments, be obtained by the host application for the secure wrapper as part of initialization. During runtime, operations to be performed by the sandboxed application that require origination from the host domain may be requested by the embedded application to the host application using a Remote Procedure Call (RPC) mechanism. This RPC mechanism may use a PostMessage interface between the insecure application and the secure wrapper to achieve secure two-way communications between the iframe sandboxed embedded application and secure wrapper.

The host may then perform the requested operations on behalf of the insecure application and return the results via RPC. In this manner, the embedded application may employ greater application privileges without increasing security vulnerabilities of the host.

Figure 8:
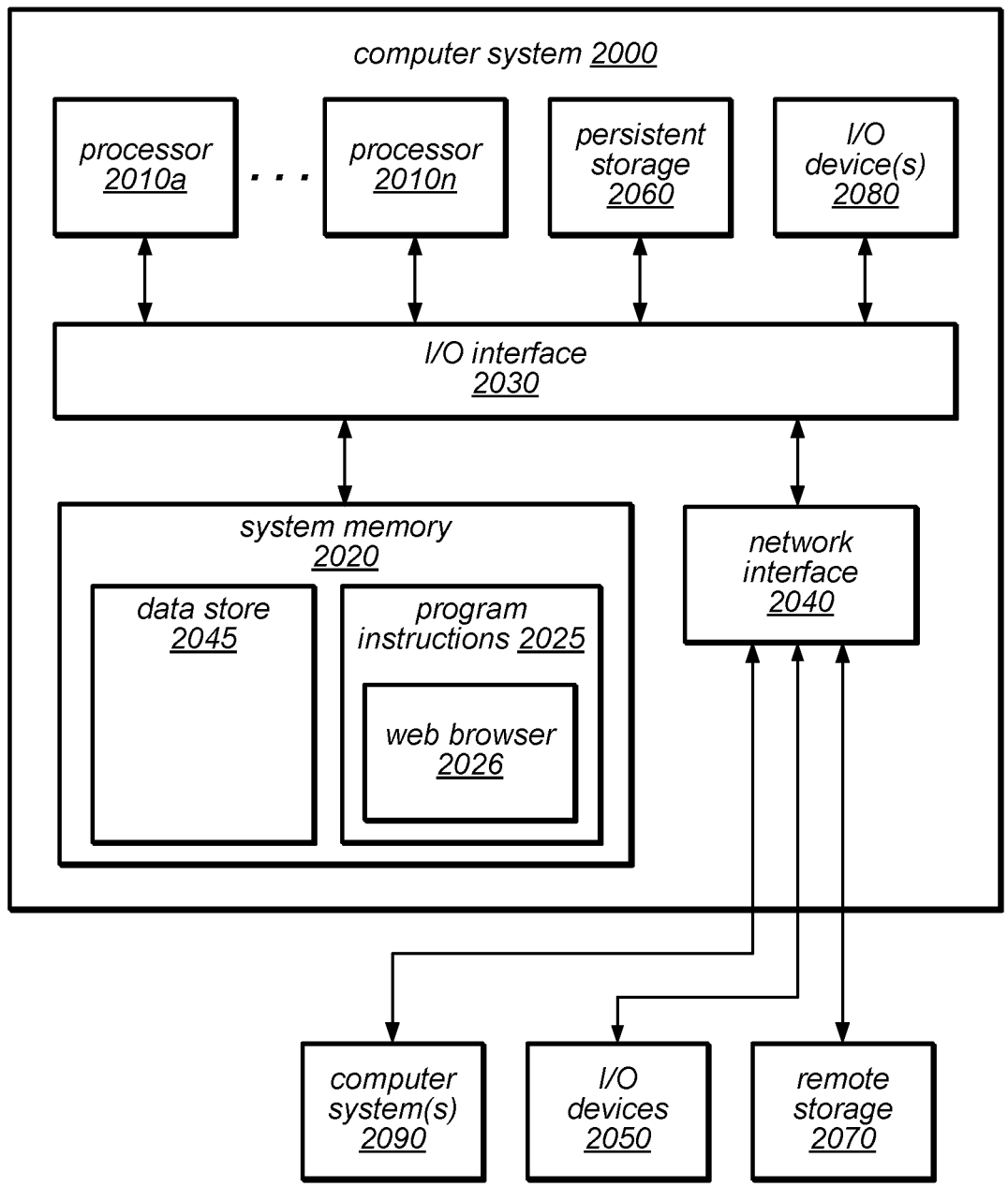
FIG. 8 is a block diagram illustrating an example computer system, according to various embodiments.

FIG. 1 is a block diagram illustrating a system that safely embeds an insecure application into a secure application, according to some embodiments. A computer system 100 may provide an interface to an end user by executing and presenting a web browser 110. Examples of computer systems 100 are discussed further below in FIG. 8.

The web browser 110 may then display a composite web application 120 which, in addition to providing some native functionality 140, may embed a number of embedded web applications 130, including embedded web application 130a and embedded web application 130b. These embedded web applications 130 may be vended from a variety of sources. In some embodiments, the embedded web applications 130 may originate from arbitrary, different domains and the embedded web applications 130 may further originate from domains different for the origination domain of the composite web application 120 itself. In other embodiments, some or all of the embedded web applications 130 may originate from the same domain as the composite web application 120 and from one another.

Figure 2:
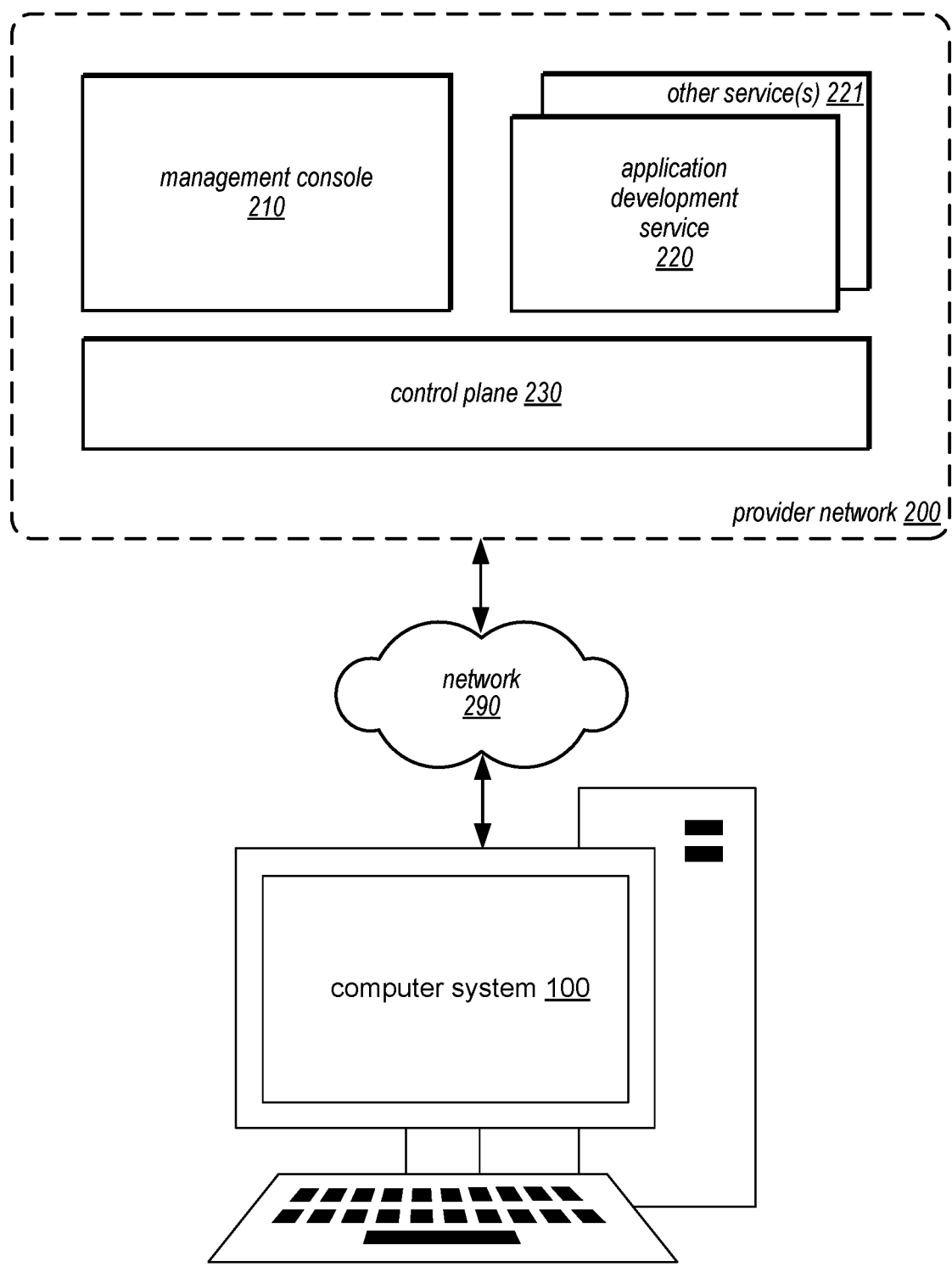
FIG. 2 is a block diagram illustrating a provider network that provides services to a system that safely embeds an insecure application into a secure application, according to some embodiments.

FIG. 2 is a block diagram illustrating a provider network that provides services to a system that safely embeds an insecure application into a secure application, according to some embodiments. A computer system, such as the computer system 100 as discussed above in FIG. 1, may provide an application 120 that further embeds one or more applications 130. These embedded applications may provide a portion of a distributed application or client-server type application, in some embodiments. For example, the computer system 100 may connected via a network 290 to a provider network 200, which may provide various services to clients.

A client of the provider network may use various services, such as an application development service 220 and other service(s) 221, and may further interact with a control plane 230 of the provider network 200 through a management console 210. To interact with at least some the services and the control plane, the client may use applications that are embedded into a composite application, as discussed in FIG. 1, where interactions with individual services may uses individual ones of the embedded applications and interactions with the control plane may, in some embodiments, use either an embedded application or native functions of the composite application.

As various applications may interact with different services providing different functionalities using different APIs, some applications may require more permissive security controls than others. For example, an application interacting with the application developments service may implement functions requiring more permissive rules than one interacting with a compute or storage service. As a result, to mitigate security risks, a mechanism is needed to prevent more permissive applications from increasing vulnerability to cross-site scripting (XSS) attacks to other applications and the composite application as a whole.

Some implementations of the provider network may be a cloud provider network. A cloud provider network (sometimes referred to simply as a "cloud") refers to a pool of network-accessible computing resources (such as compute, storage, and networking resources, applications, and services), which may be virtualized or bare-metal. The cloud may provide convenient, on-demand network access to a shared pool of configurable computing resources that may be programmatically provisioned and released in response to customer commands. These resources may be dynamically provisioned and reconfigured to adjust to variable load. Cloud computing may thus be considered as both the applications delivered as services over a publicly accessible network (e.g., the Internet, a cellular communication network) and the hardware and software in cloud provider data centers that provide those services.

A cloud provider network may be formed as a number of regions, where a region is a separate geographical area in which the cloud provider clusters data centers. Each region may include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers may connect to availability zones of the cloud provider network via a publicly accessible network (e.g., the Internet, a cellular communication network) by way of a transit center (TC). TCs may be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region may operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Computing service(s) may implement various computing resources at one or more data centers. The computing services may include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type may have a specific ratio of processing, local storage, memory, and networking resources, and different instance families may have differing types of these resources as well. Multiple sizes of these resource configurations may be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. The disclosed placement techniques may select a suitable host for the requested instance type based at least partly on the described network performance metrics.

The computing services may also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application may be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications may be "containerized" by packaging the software application in an appropriate manner and generating other artifacts (e.g., a container image, container file, other configurations) used to enable the application to run in a container engine. A container engine may run on a virtual machine instance in some implementations, with the virtual machine instance selected based at least partly on the described network performance metrics.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 3:
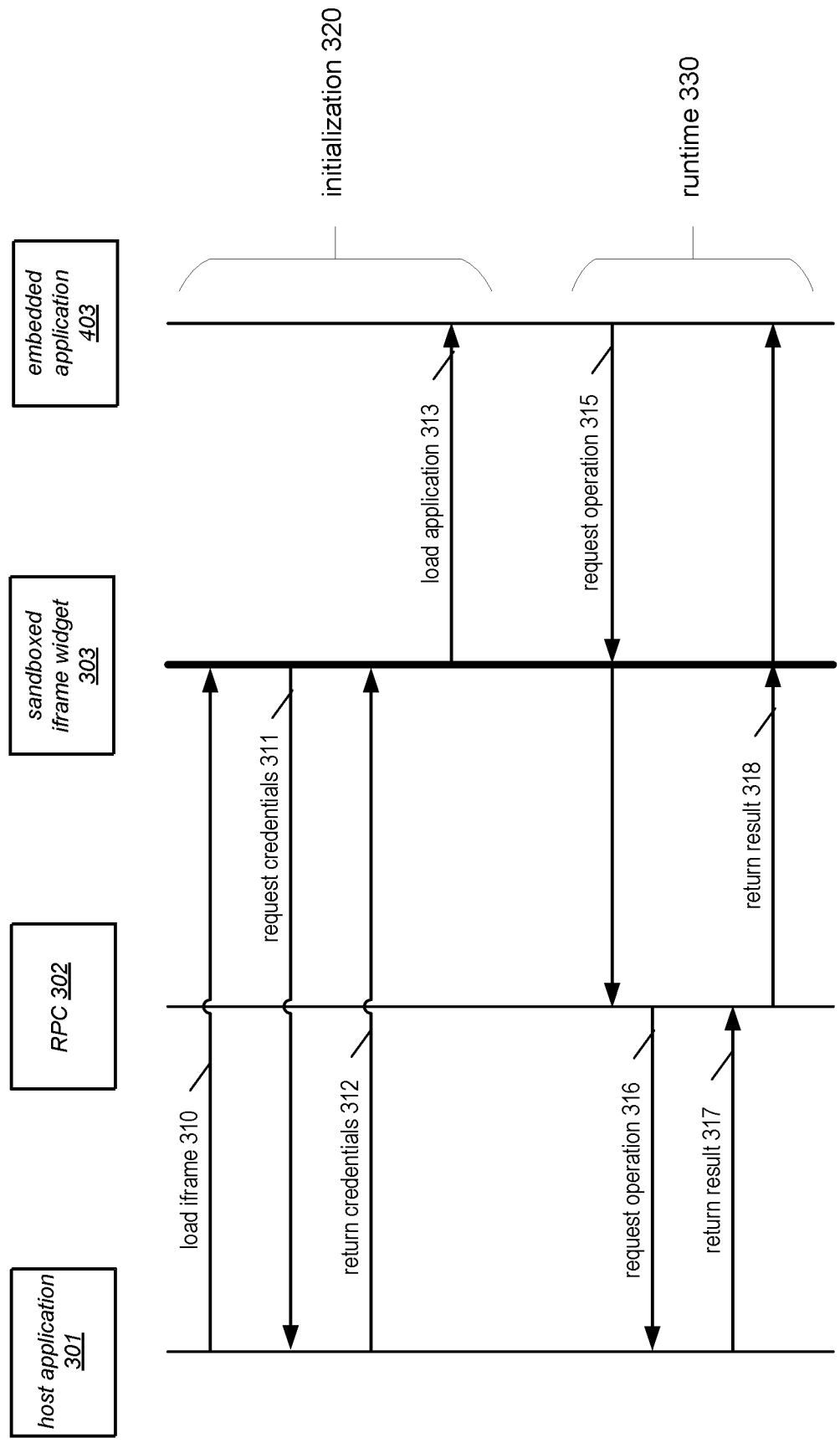
FIG. 3 is a block diagram illustrating a process flow for initializing and executing a system that safely embeds an insecure application into a secure application, according to some embodiments.

FIG. 3 is a block diagram illustrating a process flow for initializing and executing a system that safely embeds an insecure application into a secure application, according to some embodiments. This process flow may be separated into initialization 320 and runtime 330 portions. The initialization portion is discussed in greater detail in FIGS. 4 and 5 below while the runtime portion is discussed in greater detail in FIGS. 6 and 7 below.

A host application 301, such as composite web application 120 as shown in FIG. 1, may initiate the embedding of an application 403, such as the embedded application 130a of FIG. 1, through the use of a loader component by loading an iframe 310 with an application loader to create a sandboxed iframe widget 303. This application loader may, in some embodiments, originate from a domain outside the origin domain of the host application, thus creating a site boundary between the host application and the sandboxed iframe.

The application loader may then, in some embodiments, request authorization credentials 311 from the host application 311. This allows credentials for the sandboxed iframe to be obtained within the context of the origin domain of the host application. The host application 301 may then obtain and return the credentials 312 to the application loader.

Using the obtained credentials, the application loader may then load and start 313 the embedded application 403, thus completing the initialization phase.

Once loaded, the embedded application 403 in some embodiments may wish to perform an operation that may have to be performed in the context of the origin domain of the host application. To accomplish this, the embedded application may, in some embodiments, request the operation 315 via a Remote Procedure Call (RPC) interface 302, either directly or through the sandboxed iframe widget 303.

The RPC interface 302 may then interface with the host application to request the operation 316.

Upon receiving the request, the host application 301 may perform the operation and return a result 317 to the RPC interface 302. The RPC interface 302 may then, in some embodiments forward the result 318, either directly or through the sandboxed frame widget 303, to the embedded application 403. Any number of such operations may be requested, thus repeating the runtime phase repeatedly.

Some operations of the embedded application 403 may not require an origin domain of the host application in order to be performed, in some embodiments. Therefore, it should be understood that the RPC mechanism may be provided, in some embodiments, to overcome the loss of function of the embedded application 403 as a result of introducing the sandboxed iframe widget. It should also be understood that only portions of the embedded application may be sandboxed in some embodiments, those portions corresponding to operations that require more permissive security rules. Thus in some embodiments, only portions of the embedded application 403 may be sandboxed. Finally, while in this example embodiment, an RPC mechanism is disclosed for communications across sandbox boundaries, any number of communications mechanisms may be envisioned and the RPC mechanism is not intended to be limiting.

Figure 4:
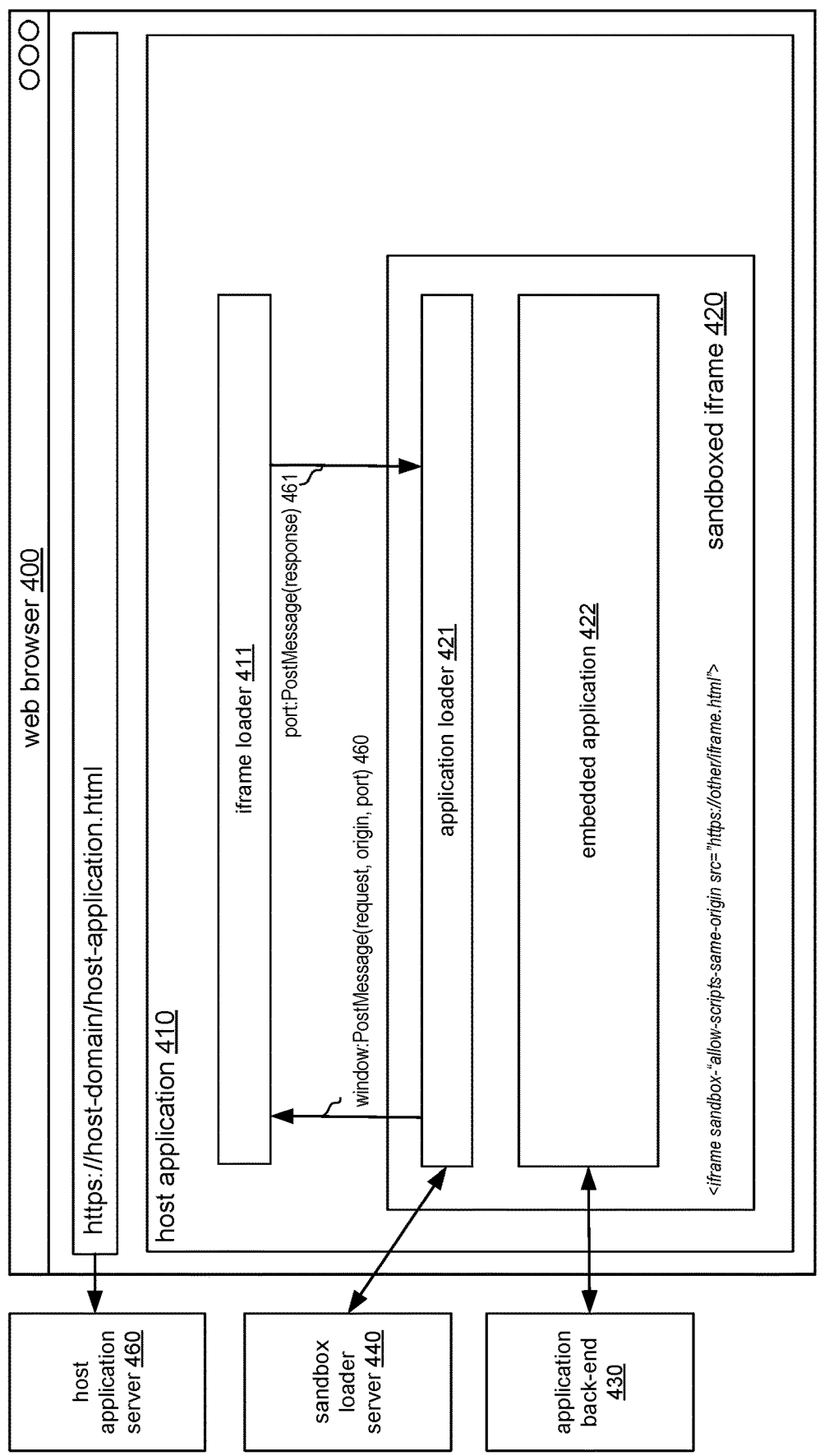
FIG. 4 is a block diagram illustrating initialization of a system that safely embeds an insecure application into a secure application, according to some embodiments.

FIG. 4 is a block diagram illustrating initialization of a system that safely embeds an insecure application into a secure application, according to some embodiments. A web browser 400, such as the web browser 110 as shown in FIG. 1, may load a host application 410, such as the composite web application 120 of FIG. 1, from a host application server 460 that is associated with an origin domain, shown as "host-domain", in some embodiments.

The host application 410 may then load an embedded application 422, such as the embedded web application 130*a* of FIG. 1, by performing the initialization phase discussed above regarding FIG. 3. First, in some embodiments an iframe loader 411 of the host application 410 may create an iframe and load into the iframe an application loader 421. This application loader may be loaded from a sandbox loader server 440 which provides an origin domain different from the origin domain of the host application server 460, thus creating a site boundary between the host application and the sandboxed iframe. The application loader origin may be specified in the iframe specification, indicated as "other" in the present example. Also present in the iframe specification may be a number of security permissions, or Content Security Policy (CSP) rules, that the embedded application will require. These CSP rule for the embedded application may differ from CSP rules required for the host application itself. Specifically, the embedded application may specify more permissions that are specified for the host application.

Once the application loader 421 is loaded, it may initiate bootstrapping of the embedded application. In some embodiments, the application loader may request authorization credentials to be obtained for the embedded application 422 by the host application 410. This may be performed, in some embodiments, using a PostMessage two-way communications mechanism. First, the application loaded sends, via a PostMessage 460, information requesting authorization, to the iframe loader. Then, the iframe loader may obtain the necessary credentials and provide the credentials to the application loader 421 via a PostMessage 461. It should be understood, however, than the use of PostMessage is but one communications implementation and any number of solutions may be envisioned.

Once authorization credentials are received in some embodiments, the application loader 421 may then load the embedded application 422. The origin domain of the embedded application has been rendered moot by the existence of the sandbox boundary provided within the iframe, therefore the embedded application may have an origin matching the host application or different from the host application. Upon loading the embedded application 422, execution of the application may begin, the embedded application in some embodiments communicating with the application back-end 430, such as the application development service 220 as shown in FIG. 2.

Figure 5:
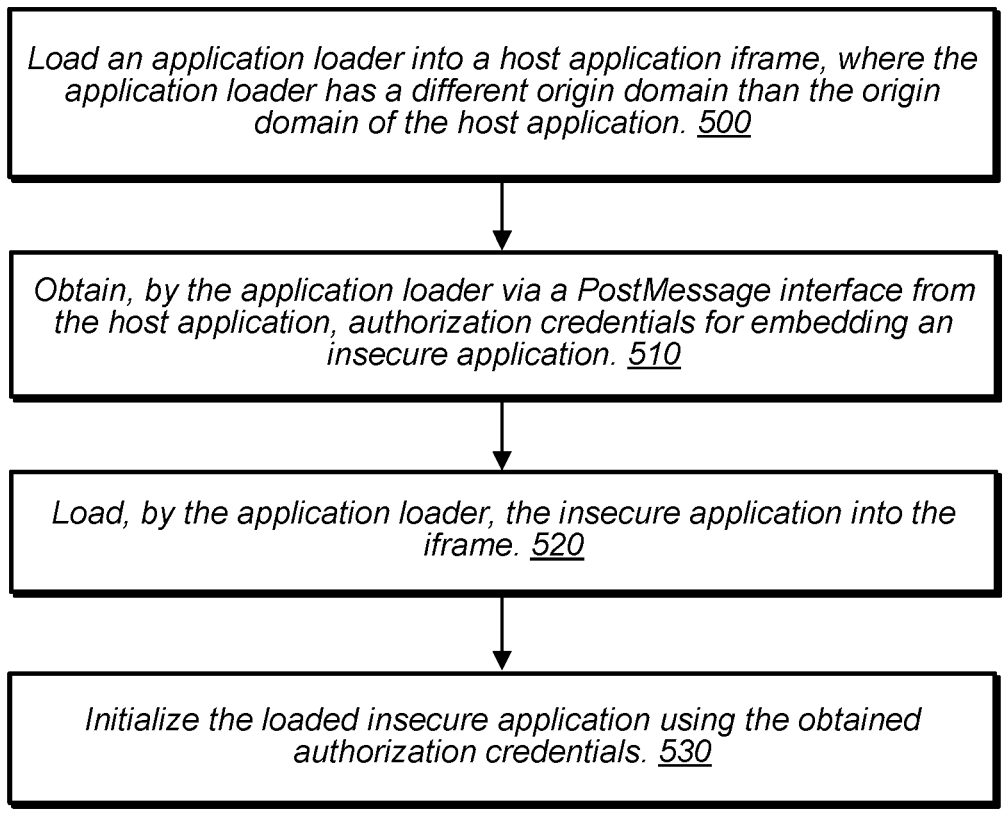
FIG. 5 is a flow diagram illustrating initialization of a system that safely embeds an insecure application into a secure application, according to some embodiments.

FIG. 5 is a flow diagram illustrating initialization of a system that safely embeds an insecure application into a secure application, according to some embodiments. The process begins at step 500 where a host application, such as the host application 410 of FIG. 4, may load an application loader, such as the application loader 421 of FIG. 4, into an iframe, such as the sandboxed iframe 420 of FIG. 4, within the host application, in some embodiments. The application loader may, in some embodiments, originate from a domain outside the origin domain of the host application, thus creating a site boundary between the host application and the iframe.

Once the application loader has been loaded into the iframe, the application loader may in step 510, signal the start of application bootstrapping by requesting and obtaining authorization credentials from the host application. The application may obtain these credentials using a PostMessage interface, such as is shown in steps 460 and 461 of FIG. 1, in some embodiments. It should be understood, however, than the use of PostMessage is but one communications implementation and any number of solutions may be envisioned.

Then, in step 520, the application loader may then load the insecure application into the sandboxed iframe, in some embodiments. The origin domain of the insecure application has been rendered moot by the existence of the sandbox boundary provided within the iframe, therefore the insecure application may have an origin matching the host application or one different from the host application.

Upon loading the embedded application 422, in step 530 initialization of the insecure application may performed using the obtained credentials.

Figure 6:
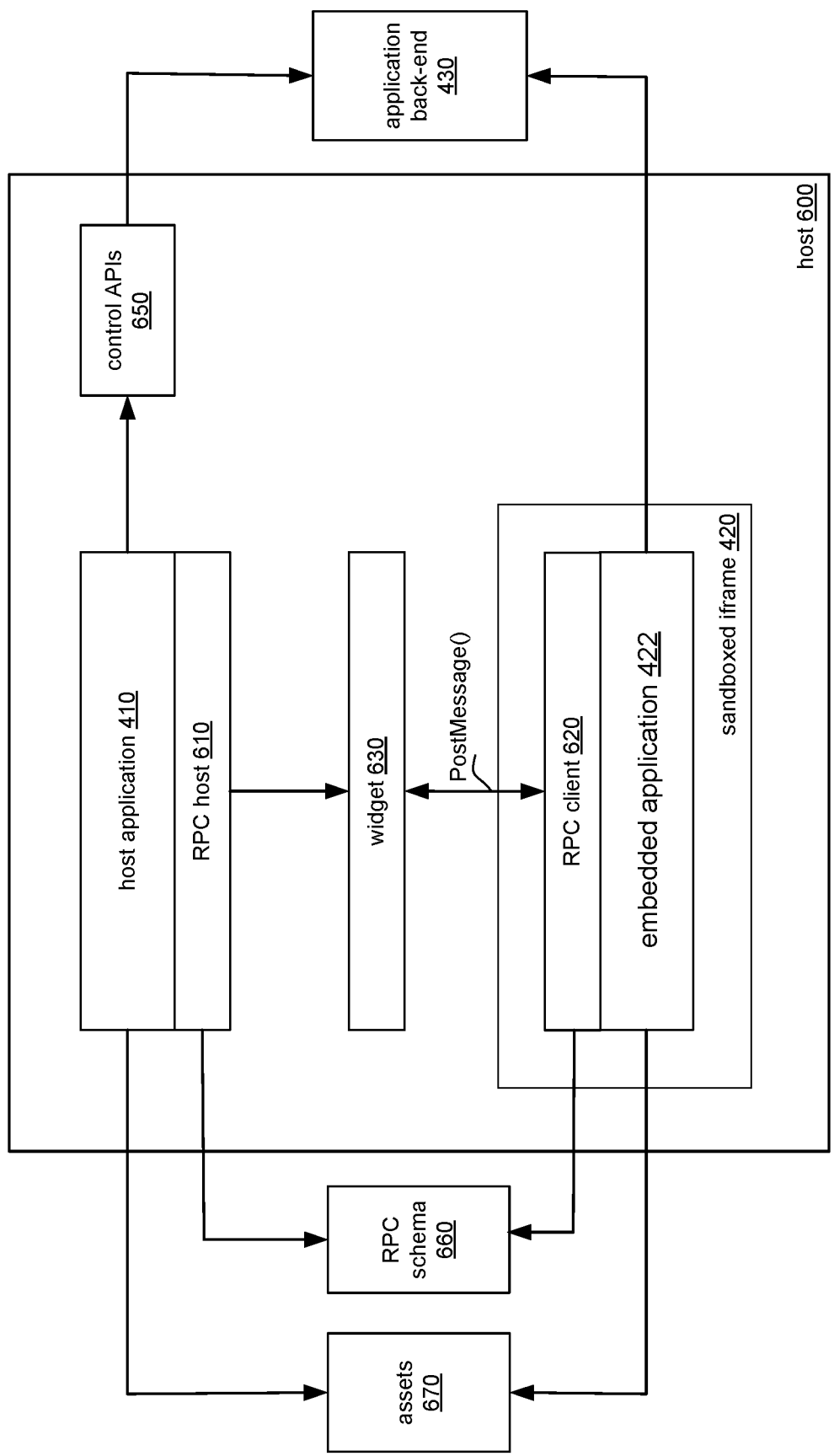
FIG. 6 is a block diagram illustrating runtime execution of a system that safely embeds an insecure application into a secure application according to some embodiments.

FIG. 6 is a block diagram illustrating runtime execution of a system that safely embeds an insecure application into a secure application according to some embodiments. A host 600 may include a host application 410, such as the composite web application 120 of FIG. 1, with an associated RPC host 610, in some embodiments, The host 600 may also include a widget 630 which may include runtime communications functions between the host application 410 and an embedded application 422 and may also integration initialization functions such as those of the application loader 421 of FIG. 4. Also, the host 600 may include an embedded application 422, such as the embedded web application 130*a* of FIG. 1, with an associated RPC client 620. The RPC host and client may collectively provide communications between the host application 410 and the embedded application 422 that may otherwise be prohibited by the sandboxed iframe 420 which contains and isolates the embedded application. The RPC host and client may communicated using an API that is specified by and RPC schema 660. Furthermore, the RPC client 620 may communicate directly with the RPC host (not shown) or, in some embodiments, the RPC client may connect to the RPC host via the widget 630 via a PostMessage interface, such as is shown in steps 460 and 461 of FIG. 4.

The host application 410 and the embedded application 422 may individually access assets 670, in some embodiments. Such assets may be provided, for example, by various services 221 of a provider network 200 as shown in FIG. 2. In addition, the embedded application may communicate with an application back-end 430, for example as provided by an application development service 220 as shown in FIG. 2. In some cases, access to the application back-end may require an origination domain of the host application which is prevented by the sandboxed iframe 420. In this case, the embedded application may request, in some embodiments, via RPC that the host application perform the accesses to the assets 670. To perform such RPC accesses, the host application 410 may then use control APIs 650 to access the application back-end on the behalf of the embedded application.

Figure 7:
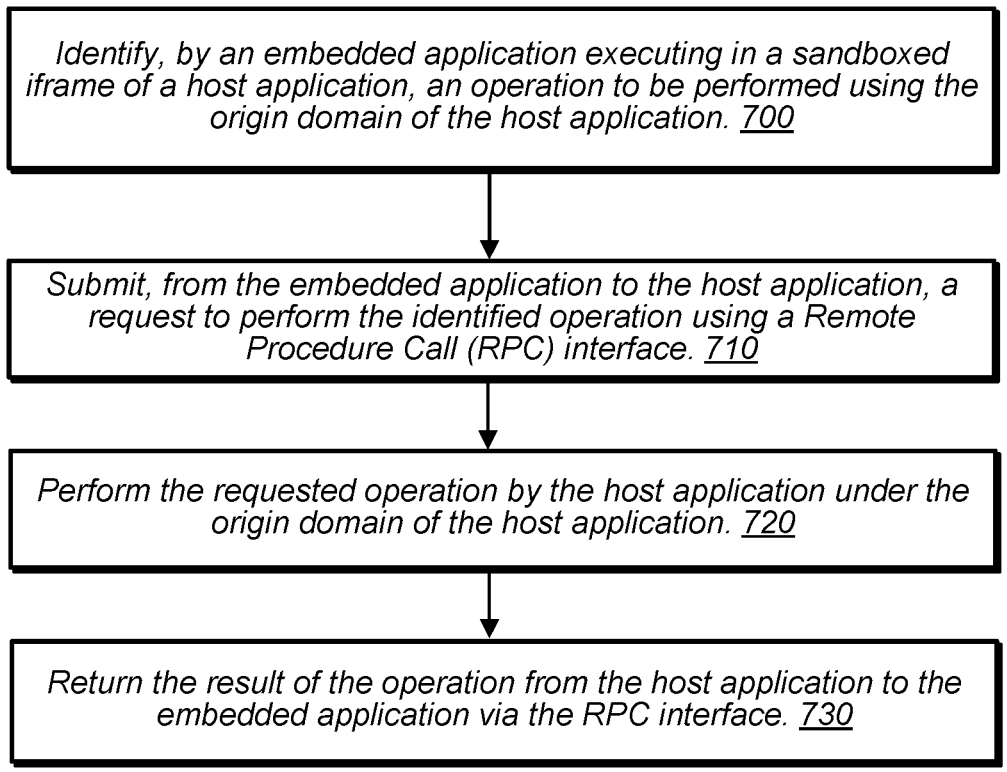
FIG. 7 is a flow diagram illustrating runtime execution of a system that safely embeds an insecure application into a secure application according to some embodiments.

FIG. 7 is a flow diagram illustrating runtime execution of a system that safely embeds an insecure application into a secure application according to some embodiments. The process begins a step 700 where an operation, such as the operation identified in step 315 of FIG. 3, may be identified to be performed by an application, such as the embedded application 422 of FIG. 6, that is embedded in a sandboxed iframe, such as the sandboxed iframe 420 of FIG. 6, of a host application, such as the host application 410 of FIG. 6, so that the origin domain, such as the domain associated with sandbox loader server 440 of FIG. 4, of the sandboxed iframe has an origin domain different from an origin domain required by the embedded application, such as the domain associated with the host application server 460 of FIG. 4, in some embodiments.

The process may then proceed to step 710 where a request to perform the identified operation may be submitted, via a Remote Procedure Call (RPC) interface such as the RPC 302 of FIG. 3, to the host application, in some embodiments. The host application may then, as shown in step 720, execute the operation on behalf of the embedded application.

Upon completion of the operation, as shown in step 730, the host application may then return a result of the operation to the embedded application via the RPC interface.

Various ones of the illustrated embodiments may include one or more computer systems 2000 such as that illustrated in FIG. 6 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for providing a web browser, as indicated at 2026, are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANS, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 6 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
   at least one processor and a memory configured to execute a web browser, the web browser configured to:
   embed an insecure web application within a host web application, wherein the insecure web application comprises one or more accesses to an application back-end, wherein the insecure web application requires Content Security Policy (CSP) rules excluded from the host web application to allow the one or more accesses to the application back-end, and wherein to embed the insecure web application the web browser is configured to load the insecure web application in a sandboxed iframe to create a sandboxed security zone for the insecure web application different from a host security zone for the host web application;
   submit, to the host web application by the wrapped insecure application via a Remote Procedure Call (RPC) interface, a request to perform an operation, wherein the operation cannot be performed within the sandboxed security zone; and
   perform the requested operation by the host web application in compliance with the strict security policy in the host security zone.

2. The system of claim 1, wherein the sandboxed iframe and the host web application originate from different domains, and wherein the operation cannot be performed within a domain of the sandboxed iframe.

3. The system of claim 1, wherein to embed the insecure web application the web browser is configured to
   create, by an iframe loader of the host web application, the sandboxed iframe comprising an application loader originating from a domain different from a domain of the host web application;
   request, by the application loader, authorization credentials for the insecure web application; and
   return, by the iframe loader, the requested authorization credentials and
   load the insecure web application in the sandboxed iframe to create the sandboxed security zone for the insecure web application different from a host security zone for the host web application.

4. The system of claim 1, wherein the host web application is management console of a provider network, wherein the insecure web application is an integrated development environment front-end, and wherein the application back-end is a development service provided by the provider network.

5. A method, comprising:
   embedding an insecure application within a host application, wherein the insecure application comprises one or more accesses to an application back-end, wherein a permissive security policy for the insecure application is less restrictive than a strict security policy for the host application to allow the one or more accesses to the application back-end, and wherein the embedding comprises wrapping the insecure application to create a sandboxed security zone for the insecure application different from a host security zone for the host application;
   submitting, to the host application by the wrapped insecure application via a Remote Procedure Call (RPC) interface, a request to perform an operation, wherein the operation cannot be performed within the sandboxed security zone; and
   performing the requested operation by the host application in compliance with the strict security policy in the host security zone.

6. The method of claim 5, wherein the insecure application and the host application are web applications that execute in a web browser.

7. The method of claim 6, wherein the insecure application requires Content Security Policy (CSP) rules included in the permissive security policy and excluded from the strict security policy.

8. The method of claim 7, wherein the host application comprises a sandboxed iframe, and wherein wrapping the insecure application comprises loading the insecure application within the sandboxed iframe.

9. The method of claim 7, wherein the host application is management console of a provider network, wherein the insecure application is an integrated development environment front-end, and wherein the application back-end is a development service provided by the provider network.

10. The method of claim 9, wherein the sandboxed iframe and the host application originate from different domains, and wherein the operation cannot be performed within a domain of the sandboxed iframe.

11. The method of claim 9, wherein wrapping the insecure application comprises:
creating, by an iframe loader of the host application, a sandboxed iframe containing an application loader originating from a domain different from a domain of the host application;
loading the insecure application by the application loader, wherein the insecure application inherits the originating domain of the application loader.

12. The method of claim 11, further comprising:
requesting, by the application loader, authorization credentials for the insecure application; and
returning, by the iframe loader, the requested authorization credentials.

13. One or more non-transitory computer-accessible storage media storing program instructions that when executed on or across one or more computing devices cause the one or more computing devices to perform:
causing an insecure application to be embedded within a host application, wherein the insecure application comprises one or more accesses to an application back-end, wherein a permissive security policy for the insecure application is less restrictive than a strict security policy for the host application to allow the one or more accesses to the application back-end, and wherein the embedding comprises wrapping the insecure application to create a sandboxed security zone for the insecure application different from a host security zone for the host application;
receiving, at the host application from the wrapped insecure application via a Remote Procedure Call (RPC) interface, a request to perform an operation, wherein the operation cannot be performed within the sandboxed security zone; and
performing the requested operation by the host application in compliance with the strict security policy in the host security zone.

14. The one or more non-transitory computer-accessible storage media of claim 13, wherein the insecure application and the host application are web applications that execute in a web browser.

15. The one or more non-transitory computer-accessible storage media of claim 14, wherein the insecure application requires Content Security Policy (CSP) rules to be included in the permissive security policy and to be excluded from the strict security policy.

16. The one or more non-transitory computer-accessible storage media of claim 15, wherein the host application comprises a sandboxed iframe, and wherein wrapping the insecure application comprises loading the insecure application within the sandboxed iframe.

17. The one or more non-transitory computer-accessible storage media of claim 15, wherein the host application is management console of a provider network, wherein the insecure application is an integrated development environment front-end, and wherein the application back-end is a development service provided by the provider network.

18. The one or more non-transitory computer-accessible storage media of claim 17, wherein the sandboxed iframe and the host application originate from different domains, and wherein the operation cannot be performed within a domain of the sandboxed iframe.

19. The one or more non-transitory computer-accessible storage media of claim 17, wherein wrapping the insecure application comprises:
creating, by an iframe loader of the host application, a sandboxed iframe containing an application loader originating from a domain different from a domain of the host application;
loading the insecure application by the application loader, wherein the insecure application inherits the originating domain of the application loader.

20. The one or more non-transitory computer-accessible storage media of claim 19, further comprising:
requesting, by the application loader, authorization credentials for the insecure application; and
returning, by the iframe loader, the requested authorization credentials.

* * * * *